(12) United States Patent
Hogan

(10) Patent No.: US 10,884,709 B2
(45) Date of Patent: Jan. 5, 2021

(54) GENERATING AN APPLICATION PROGRAMMING INTERFACE BY ANALYZING SOURCE CODE METADATA

(71) Applicant: INTERNATIONAL BUSINESS MACHINES CORPORATION, Armonk, NY (US)

(72) Inventor: Seana Hogan, Valley Springs, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/025,061

(22) Filed: Jul. 2, 2018

(65) Prior Publication Data

US 2020/0004509 A1 Jan. 2, 2020

(51) Int. Cl.
*G06F 8/30* (2018.01)

(52) U.S. Cl.
CPC ..................... *G06F 8/30* (2013.01)

(58) Field of Classification Search
None
See application file for complete search history.

(56) References Cited

U.S. PATENT DOCUMENTS

| | | | |
|---|---|---|---|
| 6,904,598 B2 | 6/2005 | Abileah | |
| 7,941,543 B2 | 5/2011 | Moussallam | |
| 8,326,963 B2 | 12/2012 | Moussallam | |
| 8,819,621 B2 | 8/2014 | Naik | |
| 9,176,714 B2 | 11/2015 | Majoros | |
| 9,509,697 B1 * | 11/2016 | Salehpour | ............... G06F 21/52 |
| 2006/0241961 A1 | 10/2006 | Tsyganskiy | |
| 2007/0294268 A1 | 12/2007 | Belyy | |
| 2012/0023488 A1 * | 1/2012 | Morris | .................. G06F 8/4435 717/137 |

(Continued)

OTHER PUBLICATIONS

Aakash Ahmad, Muhammad Ali Babar, "A framework for architecture-driven migration of legacy systems to cloud-enabled software," WICSA '14 Companion Proceedings of the WICSA 2014 Companion Volume, Article No. 7.

(Continued)

*Primary Examiner* — Chat C Do
*Assistant Examiner* — William C Wood
(74) *Attorney, Agent, or Firm* — Cantor Colburn LLP; Teddi Maranzano

(57) ABSTRACT

A computer-implemented method for generating an application programming interface (API) includes receiving metadata describing one or more source files of a program. The source files define a plurality of modules, and a first module is selected from among the plurality of modules. A chain of modules is traversed beginning at the first module, based on the metadata, where the chain of modules represents nested module calls described in the metadata. The traversing includes maintaining a set of common include files that are common to each module visited in the traversal of the chain of modules. Each include file in the set of common include files is placed into at least one of a request file list and a response file list. An API is generated for the module by submitting the set of common include files, the request file list, and the response file list to an API generator.

17 Claims, 5 Drawing Sheets

(56) References Cited

U.S. PATENT DOCUMENTS

2014/0282424 A1\* 9/2014 Sheridan ............. G06F 11/3604
717/127
2014/0337865 A1\* 11/2014 Doughty ................... G06F 8/30
719/328
2015/0089063 A1 3/2015 Soni
2016/0226722 A1\* 8/2016 Corcoran ................ H04L 67/10
2016/0292066 A1\* 10/2016 Stevens ............... G06F 11/3624

OTHER PUBLICATIONS

Rocket Seagull, a White Paper "The Last Mile of Integration A Simpler Way to Connect Existing Systems to SOA," www.seagullsoftware.com; Undated, 9 pgs.

\* cited by examiner

GENERATING AN APPLICATION PROGRAMMING INTERFACE BY ANALYZING SOURCE CODE METADATA

BACKGROUND

The present invention relates to application programming interfaces and, more specifically, to generating an application programming interface by analyzing source file metadata.

Many organizations are tasked with modernizing legacy applications, such as by creating web-based interfaces. However, such modernization generally requires use of an application programming interface (API) that can be used to access functionality of an application. Determining an API manually can be a time-intensive and energy-intensive task that requires developing an understanding of every module defined in the application code.

SUMMARY

Embodiments of the present invention are directed to a computer-implemented method for generating an application programming interface (API). A non-limiting example of the computer-implemented method includes receiving metadata describing one or more source files of a program, where the one or more source files define a plurality of modules. A first module is selected from among the plurality of modules. A chain of modules is traversed beginning at the first module, based on the metadata, where the chain of modules represents one or more nested module calls described in the metadata. The traversing includes maintaining a set of common include files having one or more include files that are common to each module visited in the traversal of the chain of modules. Each include file in the set of common include files is placed into at least one of a request file list and a response file list. An API is generated for the module by submitting the set of common include files, the request file list, and the response file list to an API generator.

Embodiments of the present invention are directed to a system for generating an API. A non-limiting example of the system includes a memory having computer-readable instructions and one or more processors for executing the computer-readable instructions. The computer-readable instructions include receiving metadata describing one or more source files of a program, where the one or more source files define a plurality of modules. Further according to the computer-readable instructions, a first module is selected from among the plurality of modules. A chain of modules is traversed beginning at the first module, based on the metadata, where the chain of modules represents one or more nested module calls described in the metadata. The traversing includes maintaining a set of common include files having one or more include files that are common to each module visited in the traversal of the chain of modules. Each include file in the set of common include files is placed into at least one of a request file list and a response file list. An API is generated for the module by submitting the set of common include files, the request file list, and the response file list to an API generator.

Embodiments of the invention are directed to a computer-program product for generating an API, the computer-program product including a computer-readable storage medium having program instructions embodied therewith. The program instructions are executable by a processor to cause the processor to perform a method. A non-limiting example of the method includes receiving metadata describing one or more source files of a program, where the one or more source files define a plurality of modules. Further according to the method, a first module is selected from among the plurality of modules. A chain of modules is traversed beginning at the first module, based on the metadata, where the chain of modules represents one or more nested module calls described in the metadata. The traversing includes maintaining a set of common include files having one or more include files that are common to each module visited in the traversal of the chain of modules. Each include file in the set of common include files is placed into at least one of a request file list and a response file list. An API is generated for the module by submitting the set of common include files, the request file list, and the response file list to an API generator.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
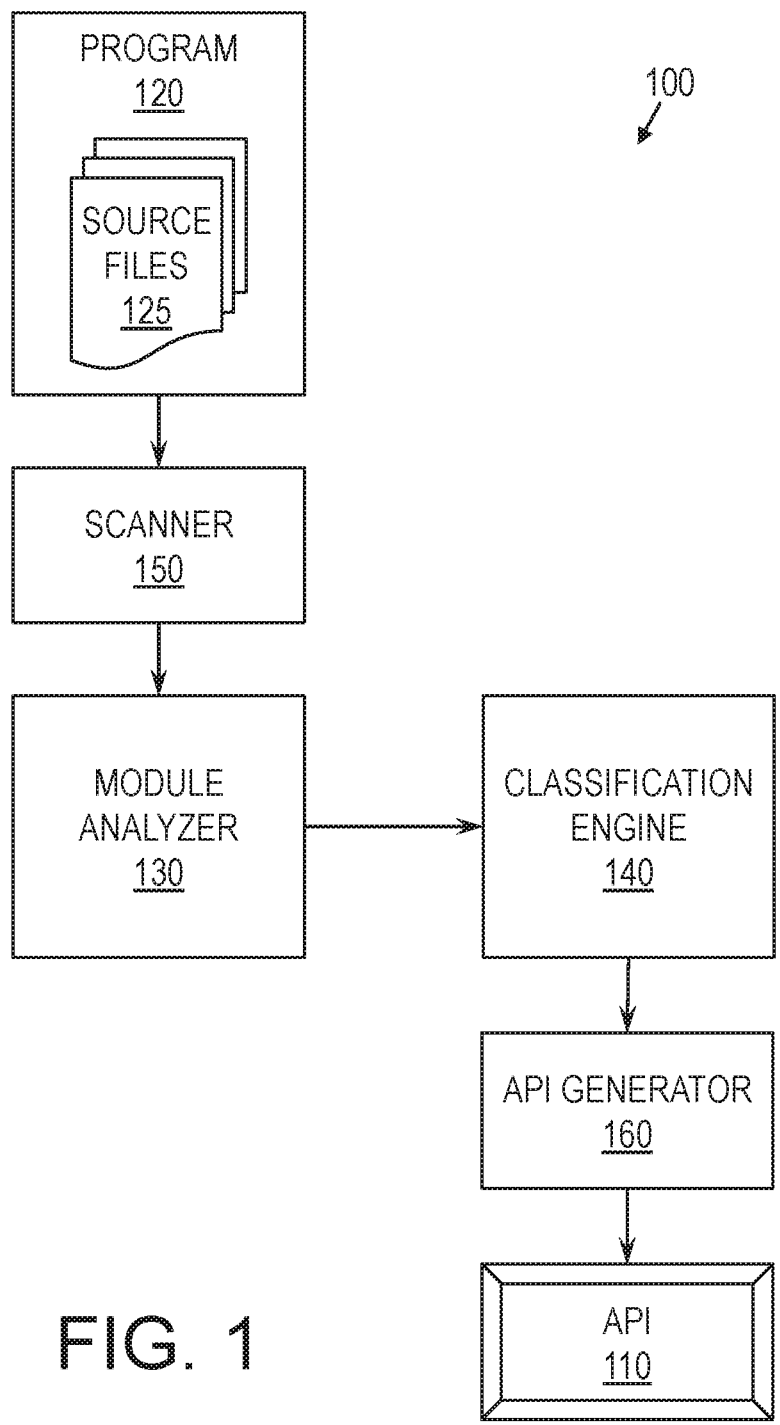
FIG. 1 is a block diagram of a generation system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, simple scanners exist to input program code and output metadata describing that program code. One such scanner is IBM® Rational® Asset Analyzer. Further, an API generation tool, such as IBM z/OS Connect EE API Editor, can generate an API for a module if given the module's name and input and output structures. However, there is currently no automated bridge between these tools, and human intervention is needed to convert the metadata into appropriate input for an API generator.

Turning now to an overview of the aspects of the invention, one or more embodiments of the invention address the above-described shortcomings of the prior art by providing a bridge between, on one side, metadata provided by a scanner and, on the other side, an API generator such as z/OS Connect. Specifically, according to some embodiments of the invention, a generation system extracts the names of high-level language structures to use for the construction of API request and response interfaces, and determines which symbols in those structures represent input and which represent output. The generation system may input metadata describing one or more source files of a program. For a selected module defined in the source files and thus described in the metadata, the generation system may identify candidate include files that are included in a call chain of modules beginning at the selected module, where each candidate include file utilizes one or more symbols. The various candidate include files and the symbols therein may be categorized into request and response categories. An API generator may use the candidate include files and the categorizations to generate an API for the module in question. Thus, an API may be generated for a call chain of modules beginning at the selected module.

The above-described aspects of the invention address the shortcomings of the prior art by providing the needed bridge between a simple scanner and an API generator, to enable generation of an API. This can be especially useful when dealing with legacy applications, which can be large, complex, and not yet adapted for modern use. In short, some embodiments of the invention are an improvement upon current API generation tools, as they expand the scope of tasks that can be automated.

Turning now to a more detailed description of aspects of the present invention, FIG. 1 is a block diagram of a generation system 100 according to some embodiments of the invention. Generally, the generation system 100 may create an API 110 for a program 120, such as a legacy application, based on one or more source files 125 of the program 120. In some embodiments of the invention, the program 120 is written in a high-level language, such as COBOL, PL/1, C, C++, or Java.

To create the API 110 for each particular module in the program 120, the generation system 100 may identify a chain of modules beginning at the particular module of the program 120, and may identify one or more candidate include files of that chain. The candidate include files may be categorized as representing requests or responses. Further, each module may include a plurality of symbols, such as variable names, which the generation system 100 may categorize into request symbols and response symbols. An API generator 160 may take as input the categorizations of the include files and the symbols and may thus output a newly generated API 110.

As shown in FIG. 1, the generation system 100 may include a module analyzer 130 and a classification engine 140. Further, the generation system 100 may include, or may operate in conjunction with, a scanner 150 and an API generator 160. The scanner 150 may scan one or more source files 125 of the program 120 to generate metadata describing the program 120. Various simple scanners appropriate for this purpose are known in the art and may be used for the scanner 150 herein. Generally, the module analyzer 130 may analyze the modules in the program 120 based on the metadata, to identify candidate include files on which to focus, and the classification engine 140 may categorize the include files and the symbols therein. For each module in the program, the API generator 160 may take as input the respective candidate include files and categorizations for that module, and the API generator 160 may generate an API for the module.

Figure 2:
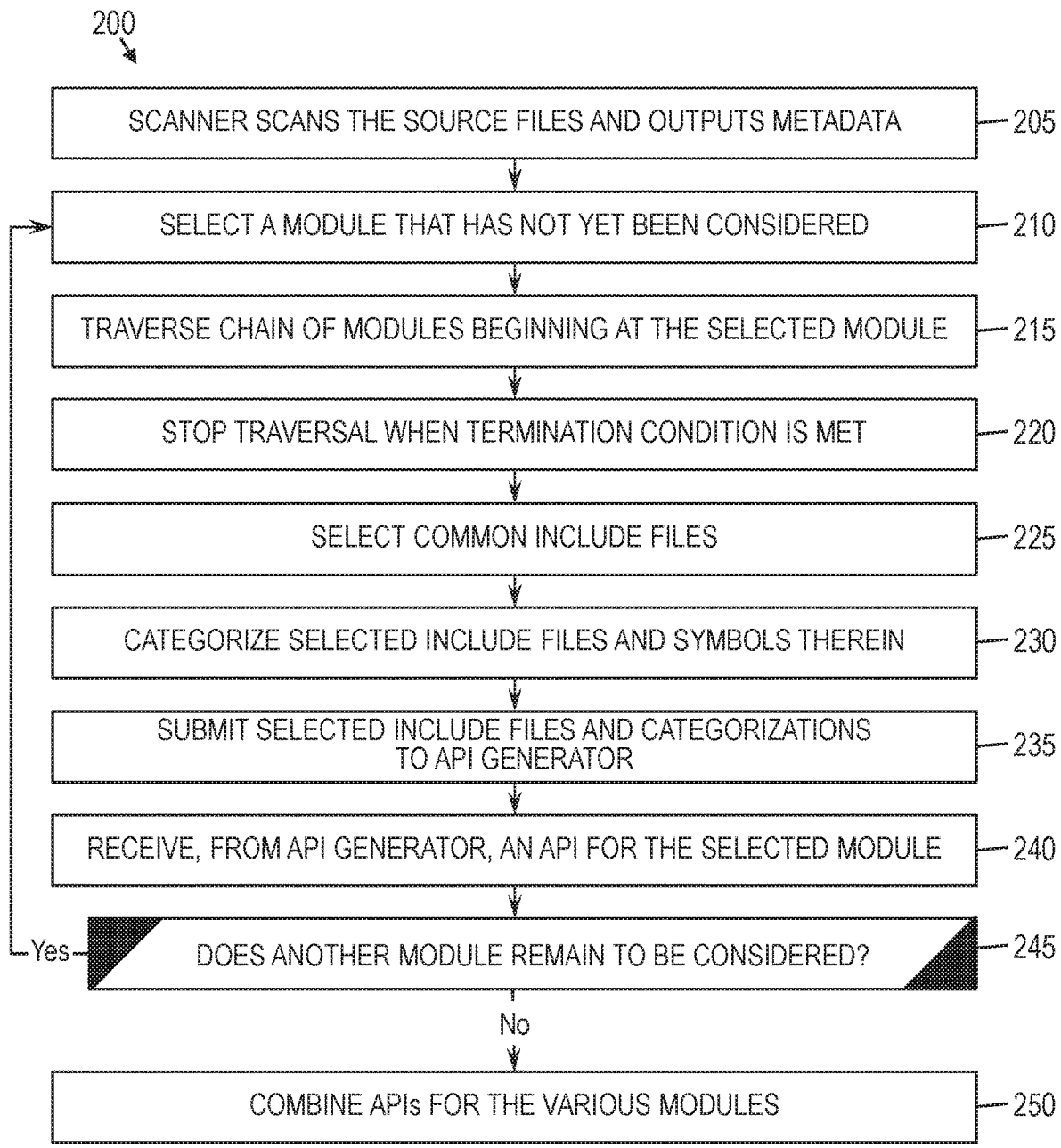
FIG. 2 is a flow diagram of a method for generating an API, according to some embodiments of the invention.

FIG. 2 is a flow diagram of a method 200 for generating an API 110, according to some embodiments of the invention. To begin the method 200, the generation system 100 may have access to one or more source files 125 of a program 120.

At block 205, the scanner 150 scans the source files 125 of the program 120. In some embodiments of the invention, the scanner 150 outputs metadata describing the program 120 and its included modules, also referred to as functions or methods, which are logical units of code that each perform a function or related functions. Specifically, the metadata may include at least, for each module in the source files 125, a list of include files (e.g., COBOL copybooks, PL/1 macros, header files, or libraries); a list of symbols; a symbol assignment for each symbol, indicating whether the symbol is a source or a destination; and a list of other modules called by the module in question. In this disclosure, an include file is a file incorporated into a source file 125 by reference within the source file 125. Further, in this disclosure, a symbol is a word or string that serves as a variable name or a constant name. In some embodiments of the invention, a symbol is deemed a source, or an input, if its value is used to assign a value to another symbol, while a symbol is deemed a destination, or an output, if it is assigned a value. For example, in the statement A=B, the symbol B is a source, and the symbol A is a destination.

Some embodiments of the generation system 100 generate an API for a call chain of modules 310 beginning at a selected module 310. However, in some cases, it may be useful to generate an API for each such call chain. In that case, each module described in the metadata, and thus appearing in the source files 125, may be considered in turn. Block 210 of the method 200 begins an iterative loop, with each iteration focusing on a selected module and generating an API 110 for the selected module. At block 210, a module is selected for consideration.

At block 215, a chain of modules beginning at the selected module may be traversed, while maintaining a set of common include files. This traversal may be performed through examination of the metadata returned by the scanner 150. As discussed above, the metadata may describe the modules called by each individual module. The selected module may call one or more other modules, each of which may call one or more other modules, etc., creating a chain of modules. Thus, the chain of modules may represent how module calls are nested within one another. Traversal and discovery of the chain may be performed simultaneously, with the chain being extended and traversed as additional modules in the chain are discovered through the metadata.

If multiple modules are called by any module in the chain, the chain may be a tree that branches at each module that calls two or more other modules. In some embodiments of the invention, in traversing the chain, a particular module that already appears in the chain, at a higher level of the chain, may be ignored and not added as the chain is built and traversed downward. In this traversal, each level of the chain may be considered in turn, and each such level may include one or more modules that are the same number of steps removed from the selected module.

While traversing the chain, which may be a tree, the generation system 100 may maintain a set of common include files. At the selected module, which is the root of the chain, the common include files may be all the include files of the selected module. At the second level of the chain, which encompasses the one or more modules called by the selected module, the include files that are not found in all modules at this level of the chain may be discarded from the common include files. Thus, the common include files maintained at each level of the chain may be the include files common to all modules at that level and higher within the chain of modules.

At block 220, the traversal may stop when a termination condition is met. The generation system 100 may seek to select as few common include files as possible, where at least one common include file is selected. Thus, the termination condition may be met when one or more of the following holds true: the final level of the chain has been reached (i.e., no module at the current level calls another module) and considered; only a single common include file is being maintained after consideration of all modules at the current level; or no common include files exist.

At block 225, a set of common include files that survived the traversal may be selected. When the termination condition is met due to no common include files existing, then the selected include files may be the common include files that existed one level up in the chain. In other words, selected include files may be the previous set of the include files that was non-empty. When the termination condition is met due to the final level of the chain having been considered, then the selected include files are those that were common to all modules at all traversed levels of the chain. In the case where the selected module calls no other modules, and thus is the final level of the chain, then the common include files may be all include files in the selected module. When the termination condition is met due to the common include files having only one include file after consideration of the full current level of the chain, then that one include file may be selected.

Figure 3:
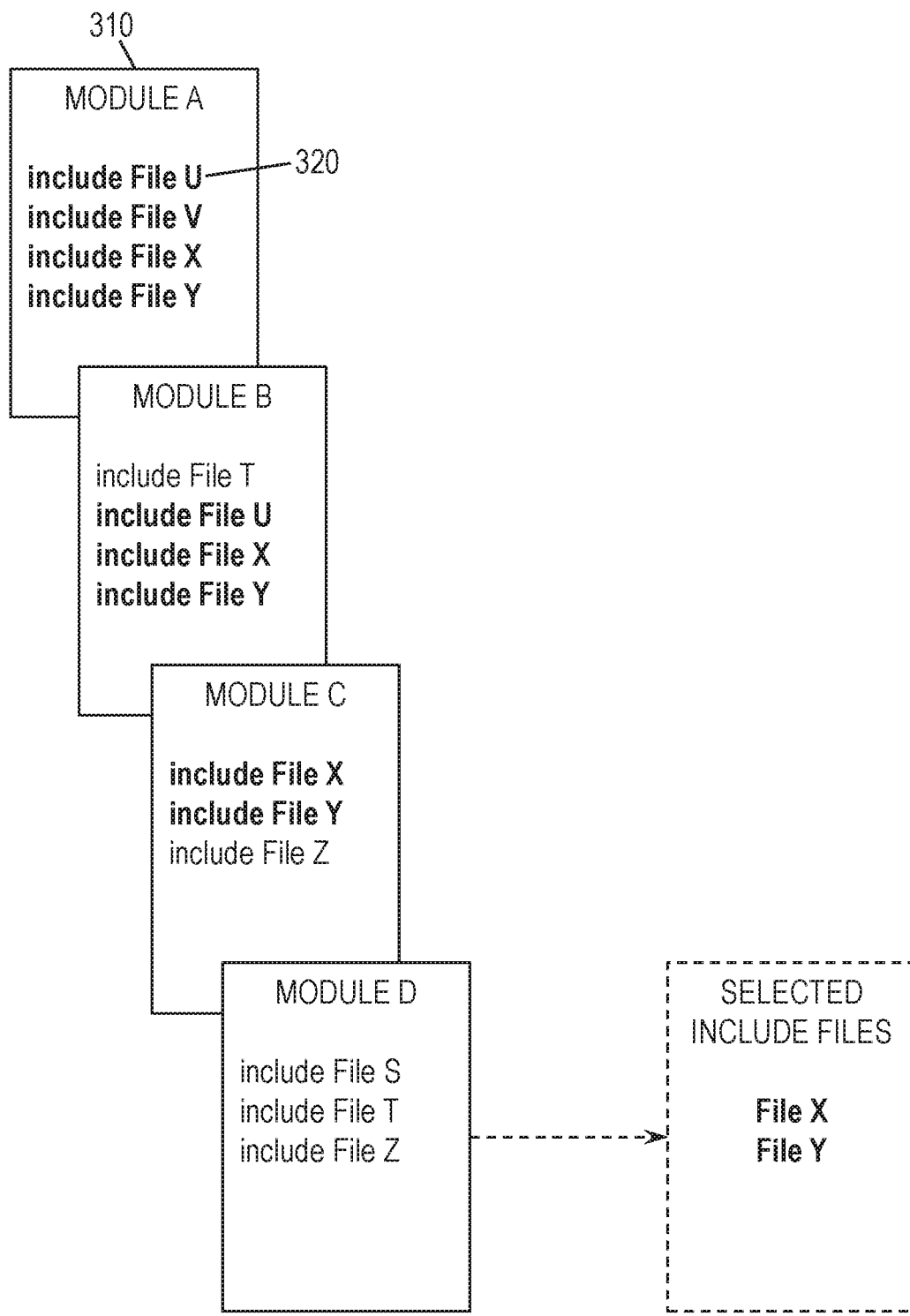
FIG. 3 illustrates traversal of a chain of modules to generate an API, according to some embodiments of the invention.

FIG. 3 illustrates traversal of a chain of modules 310 at blocks 215-225 of the method 200, according to some embodiments of the invention. This is a simplified example, in which each module 310 of the chain calls only a single other module 310. In this case, the selected module 310 is Module A. The modules 310 in the chain are Module A, Module B, Module C, and Module D. While Module D may call additional modules 310, those additional modules 310 are not considered because the termination condition is met before they would be considered. FIG. 3 illustrates the various include files 320 of each module 310. Specifically, Module A references include files File U, File V, File X, and File Y; Module B references File U, File X, File Y, and possibly additional include files 320 other than those in Module A; Module C references File X, File Y, and possibly additional include files 320 other than those in Module A; and Module D has no include files 320 in common with those above, although Module D may have other include files 320. In FIG. 3, the common include files 320 appear in bold in the list associated with each module 310.

In this case, the termination condition is met after the include files 320 of Module D are compared to the common include files 320 passed along from prior modules 310 in the chain. In this case, the selected include files 320 are File X and File Y, because those were the existing common include files 320 before the set of common include files 320 became empty in the next level of the chain.

For some API generators 160, it may be required to categorize each selected include file 320 or each symbol in the selected include files 320, or both, as either a request artifact or a response artifact. To this end, at block 230 of FIG. 2, the include files 320 or symbols in the include files 320, or both, may be categorized. Specifically, for instance, each symbol may be categorized as either a request symbol, a response symbol, both a request and response symbol, or unused, where request symbols represent input and response symbols represent output. For each include file 320 that has been selected, the metadata may be examined to determine the use attribute of each symbol therein. More specifically, the metadata may be examined to determine whether each symbol referenced therein is a source, a destination, both, or unused in the selected module 310. In some cases, a selected include file 320 includes only symbols acting as sources. In that case, the selected include file 320 as a whole, and thus all symbols therein, may be categorized as a request file. Analogously, if a selected include file 320 includes only symbols acting as destinations, then the selected include file 320, and thus all symbols therein, may be categorized as a response file. However, if a selected include file 320 includes both source and destination symbols, or at least a single symbol that acts as both source and destination, then the selected include file 320 may be categorized as both a request and a response file.

Further, within each selected include file 320 that includes both source and destination symbols, each symbol may be individually categorized. Each symbol that behaves only as a source in the selected module 310 may be categorized as a request symbol, and each symbol that behaves only as a destination in the module 310 may be categorized as a response symbol. A symbol that acts as both source and destination may be categorized as both a request and response symbol. An unused symbol need not be placed in either the request category or the response category.

Figure 4:
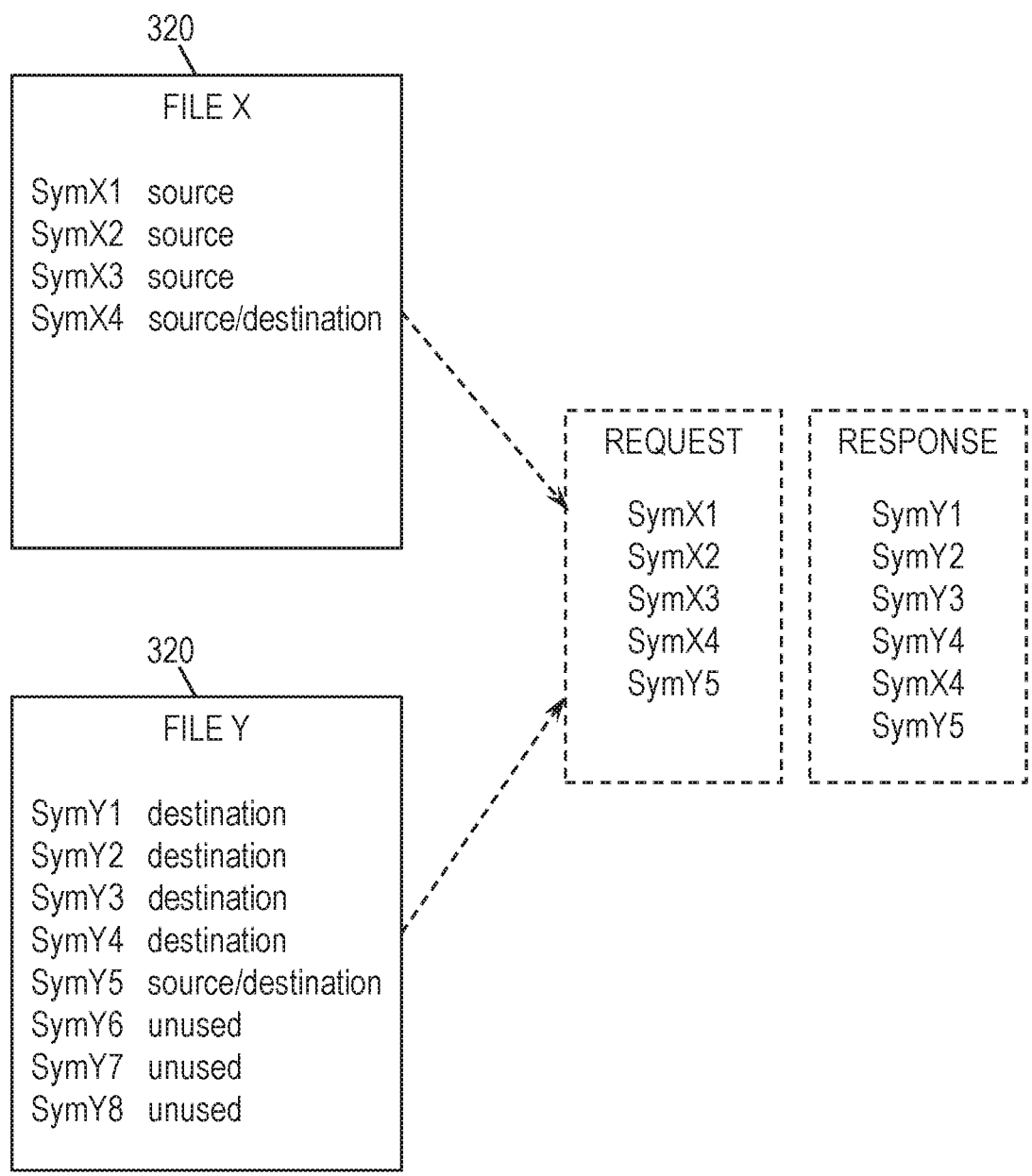
FIG. 4 illustrates the categorization of include files and symbols, according to some embodiments of the invention.

FIG. 4 illustrates the categorization of include files 320 and symbols, according to some embodiments of the invention. As shown, in this example, the selected include files 320 are File X and File Y. File X includes four symbols: SymX1, SymX2, SymX3, and SymX4. The first three of these behave only as sources, or inputs, in the selected module 310, while SymX4 behaves as both a source and a destination, or both input and output. File Y includes eight symbols: SymY1, SymY2, SymY3, SymY4, SymY5, SymY6, SymY7, and SymY8. The first four of these are destination only in the selected module 310, and SymY5 acts as both source and destination in the selected module 310. SymY6, SymY7, and SymY8 are all unused in the selected module 310. As such, both File X and File Y are categorized as both request and response files.

Additionally, SymX1, SymX2, and SymX3 are categorized as request symbols. SymY1, SymY2, SymY3, and SymY4 are categorized as response symbols. Each of SymY6, SymY7, and SymY8 is unused and is thus not categorized as either a request or response symbol. In this example, each of SymX4 and SymY5 are categorized as both a request symbol and a response symbol, because each of these symbols acts as a source as well as a destination.

In the method 200 of FIG. 2, at block 235, the selected include files 320 may be submitted to the API generator 160, along with the file and symbol categorizations. In some embodiments of the invention, such as when the API generator 160 is z/OS Connect, only a single include file 320 may be submitted per API generation. In this case, if more than a single include file 320 is selected, then these selected include files 320 may be combined into a single file before submission. Further, to submit the categorizations, manual intervention may be required to notify the API generator 160 of the category of each symbol, such as by dragging and dropping the symbols into their respective categories. An API generator 160, such as z/OS Connect, knows how to utilize the selected include files 320 and categorizations to generate an API 110 for the selected module 310. At block 240, an API 110 for the selected module 310 may be received as output from the API generator 160.

At decision block 245, it may be determined whether a module 310 in the metadata has not yet been selected for its own API generation. In some embodiments of the invention, it is irrelevant whether a particular module 310 has been considered within a chain of modules 310 that was traversed at some point. Rather, the question may be whether any module 310 has yet to be selected at block 210 and considered as a root of such a chain. If such a module 310 is identified, then the method 200 may return to block 210 to select another module 310 for API generation.

However, if no such module 310 is identified, then at block 250, the various APIs 110 generated for the various modules 310 may be combined into a unified API 110 for the program 120. At this point, the method 200 may end.

Figure 5:
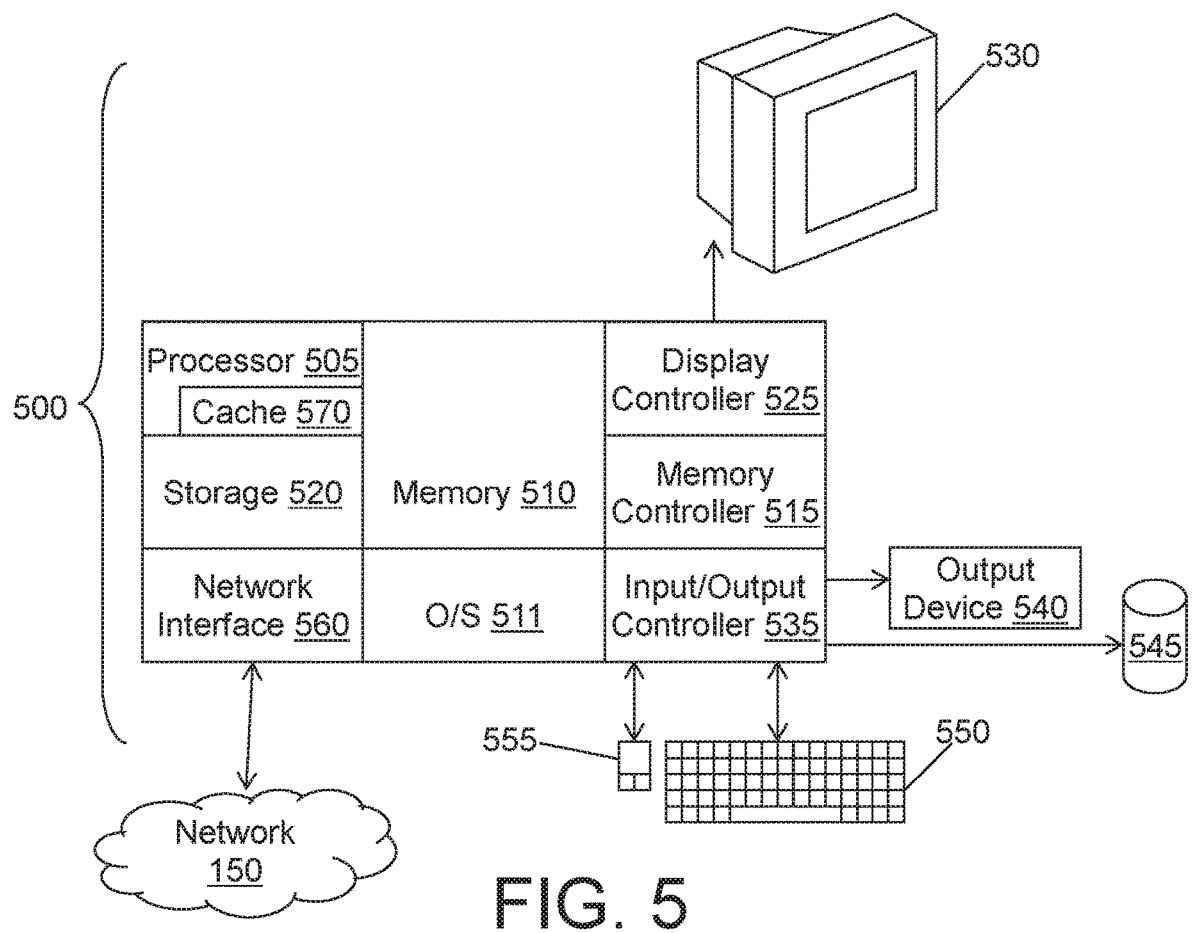
FIG. 5 is a block diagram of a computer system for implementing some or all aspects of the generation system, according to some embodiments of the invention.

FIG. 5 is a block diagram of a computer system 500 for implementing some or all aspects of the system, according to some embodiments of this invention. The generation systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the generation systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Generation systems 100 and methods according to this disclosure may be embodied, in whole or in part, in computer program products or in computer systems 500, such as that illustrated in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating an application programming interface (API), the computer-implemented method comprising:
   receiving metadata describing one or more source files of a program, wherein the one or more source files define a plurality of modules;
   selecting a first module of the plurality of modules;
   traversing a chain of modules beginning at the first module, based on the metadata, wherein the chain of modules represents one or more nested module calls described in the metadata;
   wherein the traversing comprises maintaining a set of common include files comprising one or more include files that are common to each module visited in the traversal of the chain of modules;
   placing each include file in the set of common include files into at least one of a request file list and a response file list;
   removing an include file from the set of common include files upon evaluating a module in the chain of modules that does not include the include file;
   ending the traversal when a termination condition is met, wherein the termination condition is met when the set of common include files comprises no more than a single include file; and
   generating an API for the first module by submitting the set of common include files, the request file list, and the response file list to an API generator,
   wherein the termination condition is met before every module in the chain of modules is traversed.

2. The computer-implemented method of claim 1, wherein each include file in the set of common include files comprises a plurality of used symbols, and wherein the placing each include file into at least one of a request file list and a response file list comprises, for each include file:
   determining a use attribute of each used symbol in the include file; and
   selecting at least one of the request file list and the response file list based on the use attribute of each used symbol in the include file.

3. The computer-implemented method of claim 1, wherein each include file in the set of common include files comprises a plurality of used symbols, and further comprising:
   placing each used symbol in the set of common include files into at least one of a request symbol list and a response symbol list;
   wherein generating the API further comprises submitting the request symbol list and the response symbol list to the API generator.

4. The computer-implemented method of claim 1, further comprising combining a plurality of APIs representing the plurality of modules.

5. The computer-implemented method of claim 1, wherein each include file of the set of common include files is at least one of a copybook, a macro, a header file, and a library.

6. The computer-implemented method of claim 1, wherein the metadata comprises, for each module of the plurality of modules, a list of other modules called by the module and a use attribute of each symbol of a plurality of symbols in the module.

7. A system for generating an application programming interface (API), the system comprising:
   a memory having computer-readable instructions; and
   one or more processors for executing the computer-readable instructions, the computer-readable instructions comprising:
      receiving metadata describing one or more source files of a program, wherein the one or more source files define a plurality of modules;
      selecting a first module of the plurality of modules;
      traversing a chain of modules beginning at the first module, based on the metadata, wherein the chain of modules represents one or more nested module calls described in the metadata;
      wherein the traversing comprises maintaining a set of common include files comprising one or more include files that are common to each module visited in the traversal of the chain of modules;
placing each include file in the set of common include files into at least one of a request file list and a response file list;
remove an include file from the set of common include files upon evaluating a module in the chain of modules that does not include the include file;
ending the traversal when a termination condition is met, wherein the termination condition is met when the set of common include files comprises no more than a single include file; and
generating an API for the first module by submitting the set of common include files, the request file list, and the response file list to an API generator,
wherein the termination condition is met before every module in the chain of modules is traversed.

8. The system of claim 7, wherein each include file in the set of common include files comprises a plurality of used symbols, and wherein the placing each include file into at least one of a request file list and a response file list comprises, for each include file:
determining a use attribute of each used symbol in the include file; and
selecting at least one of the request file list and the response file list based on the use attribute of each used symbol in the include file.

9. The system of claim 7, wherein each include file in the set of common include files comprises a plurality of used symbols, and the computer-readable instructions further comprising:
placing each used symbol in the set of common include files into at least one of a request symbol list and a response symbol list;
wherein generating the API further comprises submitting the request symbol list and the response symbol list to the API generator.

10. The system of claim 7, the computer-readable instructions further comprising combining a plurality of APIs representing the plurality of modules.

11. The system of claim 7, wherein each include file of the set of common include files is at least one of a copybook, a macro, a header file, and a library.

12. The system of claim 7, wherein the metadata comprises, for each module of the plurality of modules, a list of other modules called by the module and a use attribute of each symbol of a plurality of symbols in the module.

13. A computer-program product for generating an application programming interface (API), the computer-program product comprising a computer-readable storage medium having program instructions embodied therewith, the program instructions executable by a processor to cause the processor to perform a method comprising:

receiving metadata describing one or more source files of a program, wherein the one or more source files define a plurality of modules;
selecting a first module of the plurality of modules;
traversing a chain of modules beginning at the first module, based on the metadata, wherein the chain of modules represents one or more nested module calls described in the metadata;
wherein the traversing comprises maintaining a set of common include files comprising one or more include files that are common to each module visited in the traversal of the chain of modules;
placing each include file in the set of common include files into at least one of a request file list and a response file list;
removing an include file from the set of common include files upon evaluating a module in the chain of modules that does not include the include file;
ending the traversal when a termination condition is met, wherein the termination condition is met when the set of common include files comprises no more than a single include file; and
generating an API for the first module by submitting the set of common include files, the request file list, and the response file list to an API generator,
wherein the termination condition is met before every module in the chain of modules is traversed.

14. The computer-program product of claim 13, wherein each include file in the set of common include files comprises a plurality of used symbols, and wherein the placing each include file into at least one of a request file list and a response file list comprises, for each include file:
determining a use attribute of each used symbol in the include file; and
selecting at least one of the request file list and the response file list based on the use attribute of each used symbol in the include file.

15. The computer-program product of claim 13, wherein each include file in the set of common include files comprises a plurality of used symbols, and the method further comprising:
placing each used symbol in the set of common include files into at least one of a request symbol list and a response symbol list;
wherein generating the API further comprises submitting the request symbol list and the response symbol list to the API generator.

16. The computer-program product of claim 13, the method further comprising combining a plurality of APIs representing the plurality of modules.

17. The computer-program product of claim 13, wherein each include file of the set of common include files is at least one of a copybook, a macro, a header file, and a library.

* * * * *